US010803116B2

(12) United States Patent
Brailovsky

(10) Patent No.: US 10,803,116 B2
(45) Date of Patent: Oct. 13, 2020

(54) LOGO DETECTION SYSTEM FOR AUTOMATIC IMAGE SEARCH ENGINES

(71) Applicant: PicScout (Israel) Ltd., Herzliya (IL)

(72) Inventor: Leonid Brailovsky, Herzliya (IL)

(73) Assignee: PicScout (Israel) Ltd., Herzliya (IL)

( * ) Notice: Subject to any disclaimer, the term of this patent is extended or adjusted under 35 U.S.C. 154(b) by 231 days.

(21) Appl. No.: 15/136,245

(22) Filed: Apr. 22, 2016

(65) Prior Publication Data

US 2017/0169056 A1 Jun. 15, 2017

(30) Foreign Application Priority Data

Dec. 15, 2015 (IL) .......................... 243113

(51) Int. Cl.
*G06F 16/583* (2019.01)
*G06F 16/51* (2019.01)
(Continued)

(52) U.S. Cl.
CPC ............ *G06F 16/583* (2019.01); *G06F 16/51* (2019.01); *G06F 16/951* (2019.01); *G06K 9/4609* (2013.01); *G06K 9/4642* (2013.01); *G06K 9/6202* (2013.01); *G06T 3/40* (2013.01); *G06T 7/13* (2017.01); *G06K 2209/25* (2013.01);
(Continued)

(58) Field of Classification Search
CPC ............. G06K 2209/25; G06K 9/4642; G06K 9/4609; G06F 17/30247; G06F 16/583; G06F 16/951; G06F 16/51; G06T 3/40
See application file for complete search history.

(56) References Cited

U.S. PATENT DOCUMENTS

| 7,536,713 B1* | 5/2009 | Bartholomew ... G06F 17/30743 380/229 |
| 7,957,596 B2* | 6/2011 | Ofek .................... G06K 9/4642 382/168 |

(Continued)

FOREIGN PATENT DOCUMENTS

| CN | 104463233 | 3/2015 |
| EP | 2945100 | 11/2015 |

OTHER PUBLICATIONS

International Search Report and Written Opinion for counterpart International Application No. PCT/IB2016/001870, dated May 3, 2017 (10 pages).

(Continued)

*Primary Examiner* — Aleksandr Kerzhner
*Assistant Examiner* — Maher N Algibhah
(74) *Attorney, Agent, or Firm* — Perkins Coie LLP

(57) ABSTRACT

A system and method that distinguishes between logos and other categories of images, such as natural images, cartoon images, and computer-processed or generated images ("concept images"). The system receives a query image, which may, for example, be intended to be evaluated by an image search and comparison engine to identify matches to a catalog of images. The system evaluates characteristics of the query image, such as the gray-levels in the image, the edge crossings in the image, and the gradient magnitudes in the image, to identify whether the image is a logo. Based on identifying the image is a logo, the logo query image may be excluded from being evaluated by the image search and comparison engine.

18 Claims, 10 Drawing Sheets

(51) Int. Cl.
  *G06F 16/951*  (2019.01)
  *G06K 9/46*    (2006.01)
  *G06T 7/13*    (2017.01)
  *G06K 9/62*    (2006.01)
  *G06T 3/40*    (2006.01)

(52) U.S. Cl.
  CPC .............. *G06T 2207/10016* (2013.01); *G06T 2207/10024* (2013.01)

(56) References Cited

U.S. PATENT DOCUMENTS

| | | | | |
|---|---|---|---|---|
| 8,885,984 B1* | 11/2014 | Lavi | ..................... | G06K 9/4671 382/181 |
| 8,933,962 B2* | 1/2015 | Sun | ...................... | G06T 11/001 345/619 |
| 2002/0118883 A1* | 8/2002 | Bhatt | ..................... | G06T 5/002 382/224 |
| 2003/0068085 A1* | 4/2003 | Said | ......................... | G06T 7/12 382/170 |
| 2009/0063431 A1* | 3/2009 | Erol | .................. | G06F 17/30247 |
| 2009/0080774 A1* | 3/2009 | Lin | .......................... | G06K 9/34 382/176 |
| 2009/0252413 A1 | 10/2009 | Hua et al. | | |
| 2011/0026835 A1* | 2/2011 | Ptucha | ................. | G06F 16/583 382/209 |
| 2015/0278224 A1* | 10/2015 | Jaber | ................... | G06F 16/5854 707/749 |
| 2015/0347801 A1* | 12/2015 | Svetal | ................. | G06K 7/1447 235/454 |

OTHER PUBLICATIONS

Office Action received for counterpart Israeli Patent Application No. 243113, dated Jul. 18, 2018 (28 pages).

\* cited by examiner

LOGO DETECTION SYSTEM FOR AUTOMATIC IMAGE SEARCH ENGINES

CROSS-REFERENCE TO RELATED APPLICATION(S)

This application claims priority to Israel Patent Application No. 243113, entitled "LOGO DETECTION SYSTEM FOR AUTOMATIC IMAGE SEARCH ENGINES," filed Dec. 15, 2015, which is incorporated herein by reference in its entirety.

BACKGROUND

Image search and comparison engines may be used to detect identical and near-identical matches between two different images. In some cases an image search and comparison engine may automatically collect images from various sources, such as the World Wide Web, and may evaluate whether any of the automatically collected images match any of the images maintained in a catalog of images. The catalog of images may be part of an image bank containing images that are available for licensing for a fee, such that the matching of an image collected from the World Wide Web to an image in the image catalog may indicate an improper (i.e., unlicensed) use of the catalog image. The use of an image search and comparison engine to identify matches between gathered images and images in a catalog of images may have other purposes as well.

One of the challenges faced by image search engines is the existence of many images that are logos. A logo is a symbol or other design adopted by an organization to identify its products, services, or offerings. Logos are endemic to online imagery as different corporations, institutions, government and other entities vie for consumer attention and recognition. Performing image search on a logo may be undesirable for a variety of reasons. For example, performing image search to identify any matches between a logo and a catalog of images consumes computational and memory resources, which may be better used elsewhere. Additionally, performing image search on a logo may produce many undesirable "false positive" matches to the catalog of images, since logos may be present as elements (but not the focus) of catalog images. It would therefore be beneficial to determine a way to identify logos so that they might be excluded in certain search operations.

BRIEF DESCRIPTION OF THE DRAWINGS

The patent or application file contains at least one drawing executed in color. Copies of this patent or patent application publication with color drawing(s) will be provided by the Patent Office upon request and payment of the necessary fee.

DETAILED DESCRIPTION

A system and method to detect whether an image is a logo is disclosed herein. The system may be used in combination with an image search engine to detect whether an image to be evaluated by the image search engine (hereinafter a "query image") for matches to a catalog of images, is a logo. If it is determined that the query image is a logo, the query image may be filtered from the image search and comparison process, i.e., not evaluated by the image search engine. Filtering out logos prior to performing image search may be beneficial for a number of reasons, such as conserving resources of the image search engine and reducing the instances of false positive matches.

As compared to other categories of images, such as natural images, cartoon images, and computer-processed or generated images ("concept images"), it has been determined that logos often possess distinguishing characteristics. For example, logos typically contain fewer colors and less color level entropy than natural images, fewer edge crossings and less edge crossing entropy than cartoon images, and a different distribution of gradient magnitudes than concept images. By evaluating each of these characteristics that set logos apart from other categories of images, the system can determine with substantial accuracy whether a query image is a logo.

Though primarily described with reference to images, the logo detection system may also be used with video. That is, individual frames of a video may be evaluated by the logo detection system to determine whether the video frame is of a logo.

Various embodiments of the invention will not be described. The following description provides specific details for a thorough understanding and an enabling description of these embodiments. One skilled in the art will understand, however, that the invention may be practiced without many of these details. Additionally, some well-known structures or features may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Suitable Environments

Figure 1:
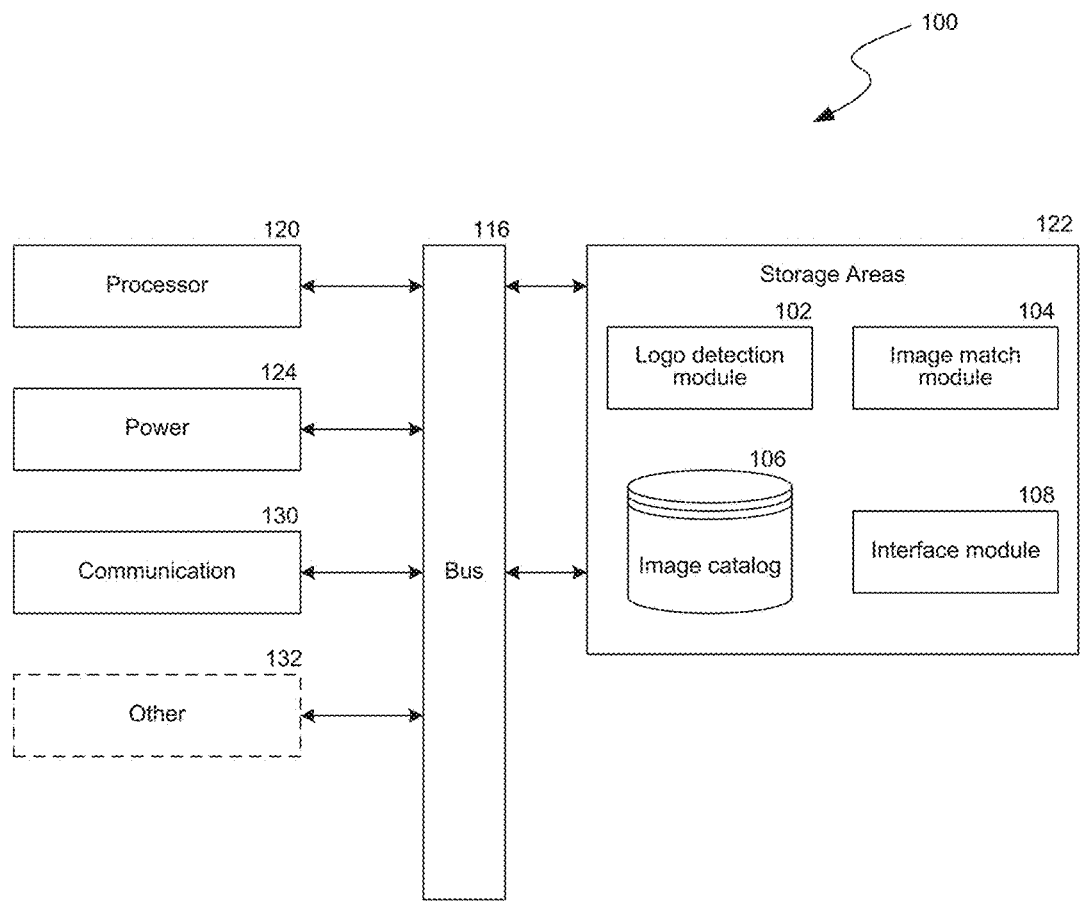
FIG. 1 is a block diagram of an image search engine that includes a logo detection system for determining whether a query image is a logo.

FIG. 1 and the following discussion provide a brief, general description of a suitable environment in which a system to detect logos may be implemented. Although not required, aspects of the invention are described in the general context of computer-executable instructions, such as routines executed by a general-purpose computer, a personal computer, a server, or other computing system. The invention can also be embodied in a special purpose computer or data processor that is specifically programmed, configured, or constructed to perform one or more of the computer-executable instructions explained in detail herein. Indeed, the term "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random access memory (RAM), read-only memory (ROM), flash memory, or the like, or a combination of such components. Computer-executable instructions may also be stored in one or more storage devices, such as magnetic or optical-based disks, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the invention can also be practiced in distributed computing environments, where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Aspects of the invention described herein may be stored or distributed on tangible, non-transitory computer-readable media, including magnetic and optically readable and removable computer discs, stored in firmware in chips (e.g., EEPROM chips). Alternatively, aspects of the invention may be distributed electronically over the Internet or over other networks (including wireless networks). Those skilled in the relevant art will recognize that portions of the invention may reside on a server computer, while corresponding portions reside on a client computer. Data structures and transmission of data particular to aspects of the invention are also encompassed within the scope of the invention.

Referring to the figures, FIG. 1 is a block diagram illustrating an image matching system 100, which includes an image search and comparison engine for detecting whether a query image matches an image from a catalog of images, and a system for identifying logos (hereinafter a "logo detection system"). The system 100 includes a logo detection module 102 that evaluates characteristics of an input query image and determines whether the query image is a logo. As will be described in additional detail herein, the logo detection module performs a series of evaluations to determine whether the query image possesses characteristics indicative of a natural image, cartoon image, or concept image, or whether the image is a logo. Based on the evaluation performed by the logo detection module, the query image may be analyzed by an image match module 104. The image match module searches an image catalog 106 for catalog images that are identical or near-identical matches to the query image.

The system 100 includes an interface module 108 that generates user interfaces for the logo detection system. The generated user interfaces may allow an operator to control different parameters of the logo detection system. For example, the operator may set various thresholds used by the logo detection system, as described herein.

The system 100 may execute code to implement module functions, and the flow or processing of information and data between modules, using one or more processors 120 in communication with a storage area 122. The storage area 122 may include volatile or non-volatile memory, such as ROM or RAM, as well as magnetic or optical storage devices, such as hard disk drives or flash storage drives. The storage area contains instructions or data necessary to implement the modules and is accessed by the processor 120 via a communications bus 116.

The system 100 receives or transmits information or data with remote computing devices (e.g., other computers connected to the Internet or other public or private networks) via a communication module 130. The communication module 130 may be any wired or wireless module capable of communicating data to and from the system. Examples include a wireless radio frequency transmitter, infrared transmitted, or hard-wired cable such as Ethernet or optical cable.

Additionally, the system 100 receives energy via a power module 124. The system may also include other additional modules 132 not explicitly described herein, such as additional microprocessor modules, communication modules, etc.

Representative Image Examples

FIGS. 2A-2D depict representative examples of different categories of images, including logos, natural images, cartoon images, and concept images. As discussed above, the system 100 evaluates characteristics of a query image to determine whether the query image is a logo, such as one of the five representative logos depicted in FIG. 2A. As previously noted, a logo is a symbol or other design adopted by an organization to identify its products, services, or offerings. Logos typically include text, graphics, or a combination thereof, and are often stylized in a manner that is recognizable and memorable. Examples of the characteristic differences between logos and other types of images are illustrated in the following representative examples.

Figure 2A:
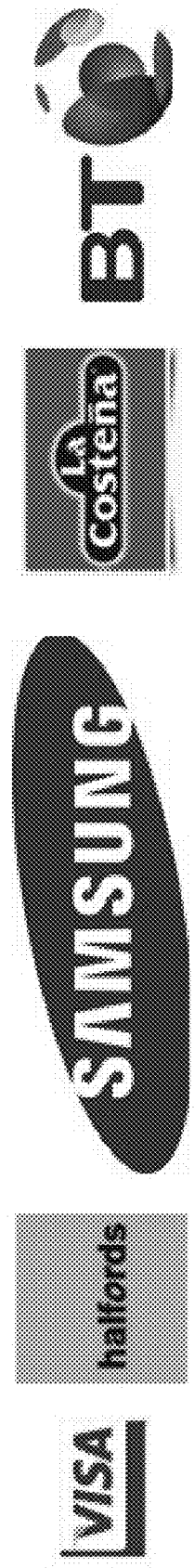
FIGS. 2A-2D depict representative examples of logos, natural images, cartoon images, and concept images.
Figure 2B:
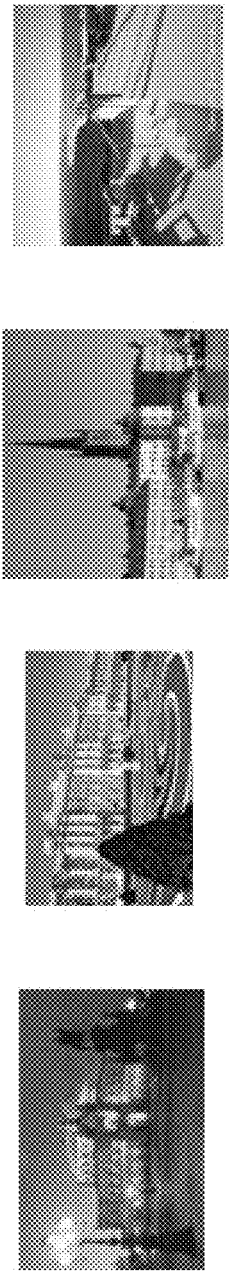

FIG. 2B depicts four representative "natural" images, reflecting people, structures, landscapes, items, or anything found in the natural world. Such images may be, for example, a photograph or an image of art. As compared to the logos depicted in FIG. 2A, it has been determined that one difference between logos and the natural images of FIG. 2B is that the natural images contain a greater number of colors and possess a greater entropy of color levels.

Figure 2C:
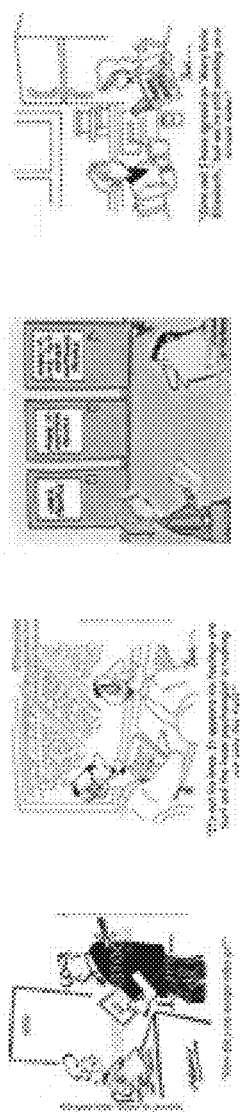

FIG. 2C depicts four representative cartoon images. As compared to the logos depicted in FIG. 2A, it has been determined that one difference between logos and the cartoon images of FIG. 2C is that cartoon images contain a greater number of edge crossings and possess a greater entropy of numbers of edge crossings in the x- and y-directions. In other words, in a cartoon image, lines in the x-direction will cross a wider range of vertical edges, and lines in the y-direction will cross a wider range of horizontal edges.

Figure 2D:
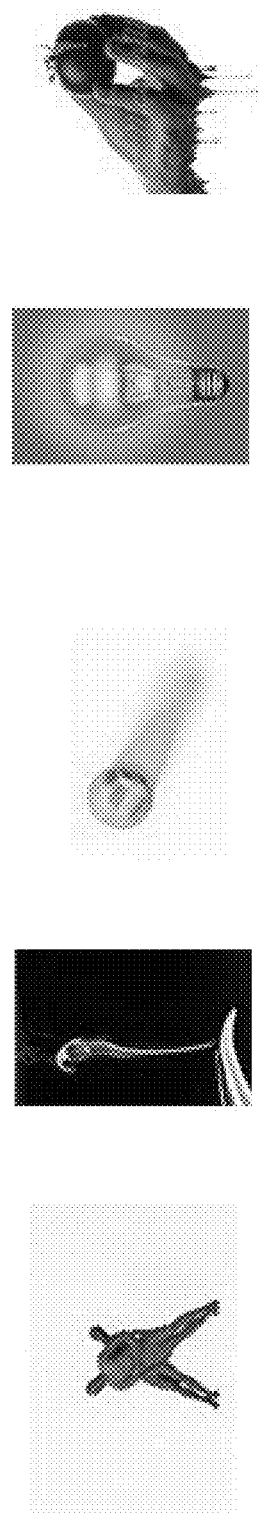

FIG. 2D depicts five representative "concept" images, which are computer-generated images or natural images that have been processed by a computer. Though concept images might originate from a natural image, due to image processing they often cannot be distinguished from a logo based on the entropy of color levels. But concept images typically focus on a particular object within the image differently from logos, and as a result, it has been determined that the gradient magnitudes in a concept image possess different characteristics from the gradient magnitudes in a logo. Specifically, the distribution of the gradient magnitudes in a concept image conform to a power function with a negative exponent.

Suitable System

Figure 3:
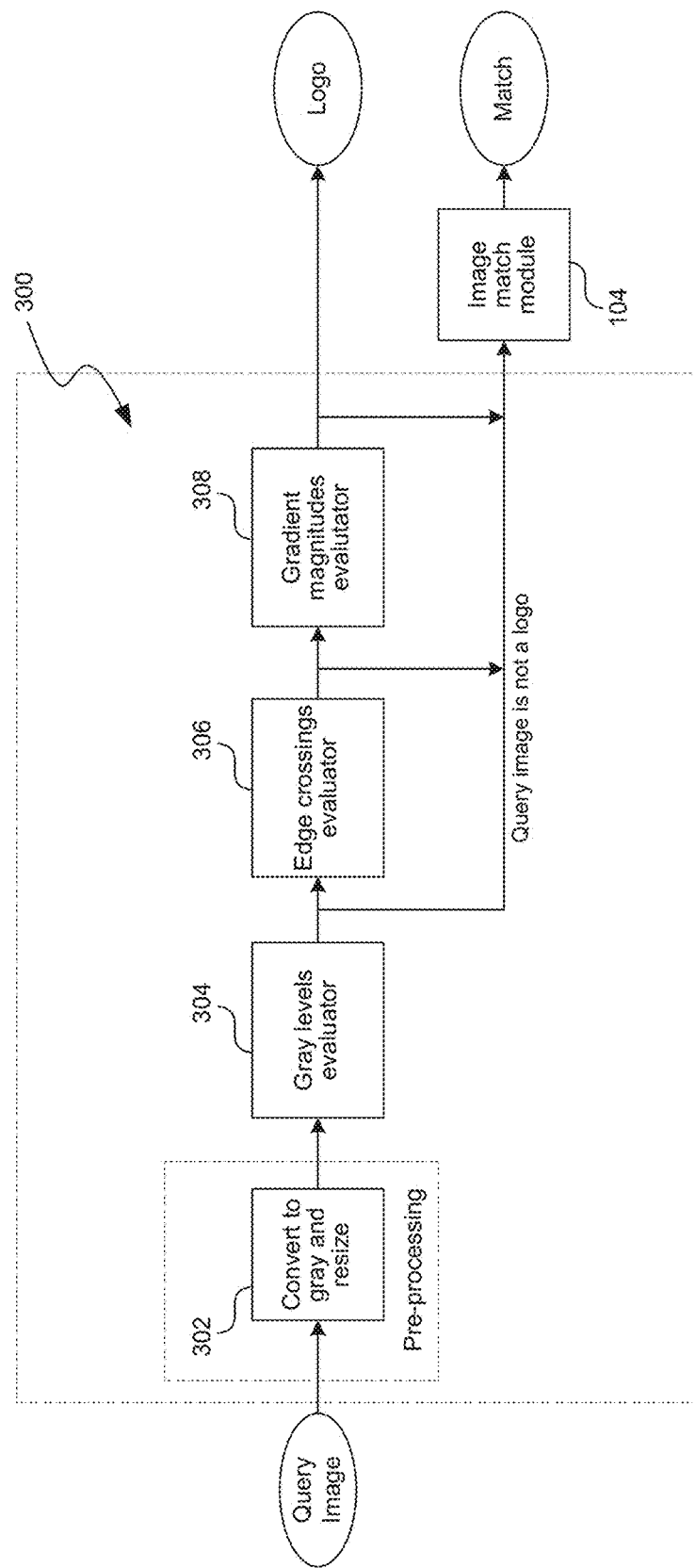
FIG. 3 is a block diagram of the logo detection system.

FIG. 3 is a block diagram of the logo detection module 102 for determining whether a query image is a logo before evaluating the query image in an image search and comparison engine. The logo detection module 102 evaluates different characteristics of the query image to determine whether the image is likely a logo or whether it likely is a different category of image. If after evaluating a particular characteristic the logo detection module determines that the query image is not a logo, then the logo detection module terminates evaluating the query image, and the query image is passed to the image search and comparison engine, such as image match module 104, to determine if the query image matches an image in the image catalog. If, however, the logo detection module's evaluation of the particular characteristic cannot determine that the query image is not a logo, then the logo detection module evaluates additional image characteristics. If, after evaluating all of the characteristics, the logo detection module still cannot determine that the query image is likely a different category of image, then the image is determined to be a logo.

Before evaluating characteristics of an image, the logo detection module may apply one or more pre-processing steps to the image. For example, a pre-processing module 302 may receive the query image in one of various formats, such as PNG, JPEG, GIF, or other format. Preferably, the format of the image is converted to JPEG for purposes of processing as described herein. The pre-processing module 302 may also convert the query image to grayscale using, for example, well known algorithms such as averaging of pixel values, luma, desaturation, etc. Although the logo detection system is described with reference to evaluating grayscale images, the same techniques applied to grayscale images may also be applied to color images. However, converting the query image to grayscale may reduce the computational complexity of the evaluation techniques described herein. The pre-processing module 302 may also re-size the image. For example, if the query image is larger than a default size then the pre-processing module may reduce the size of the query image so that it is the same size or smaller than the default size Reduction of image size may be achieved by, for example, bi-cubic interpolation, bi-linear interpolation, or other techniques. In one example the default size is 420 pixels in the maximal dimension, however other default sizes may be used.

A gray-level evaluation module 304 attempts to determine whether a query image is a natural image, or whether it may be a logo, based on the gray-levels of the query image. As described in greater detail herein, with reference to FIGS. 4 and 5, the gray-level evaluation module constructs a normalized histogram of the number of pixels in the query image having each possible gray-level. The gray-level evaluation module then computes the entropy, or scarcity, of the normalized gray-level histogram. If the gray-level entropy exceeds a specified threshold then the query image is identified as not a logo (i.e., a natural image), and the query image may be evaluated by the image search and comparison engine. If the gray-level entropy does not exceed the specified threshold then the logo detection module requires more information to determine if the query image is a logo or if it is some other non-natural image (e.g., cartoon image or concept image). In some embodiments, the gray-level entropy threshold used by the gray-level evaluation module may be configured by a user of the system based on the user's intuition or experimentation. For example, a user may configure the gray-level entropy threshold to 6.5, so that a query image with a gray-level entropy larger than 6.5 will be identified as not a logo (i.e., a natural image). In some embodiments, the gray-level entropy may be configured automatically, such as with machine learning techniques.

If the gray-level evaluation module 304 determined that the query image is not a natural image, then an edge crossing evaluation module 306 evaluates the edge crossings found in the query image to determine whether the query image is likely a cartoon image, or whether it may be a logo. As described in greater detail herein, with reference to FIGS. 6, 7A, and 7B, the edge crossing evaluation module 306 computes gradients of the query image in the x- and y-directions. From these gradients the edge crossing evaluation module determines the number of edges crossed by each line in the x- and y-direction of the query image, and computes histograms of the number of edge crossings in each direction. The edge crossing evaluation module 306 then computes the entropy, or scarcity, of the edge crossings histograms. If the edge crossing entropy exceeds a specified threshold then the query image is identified as not a logo (i.e., the image is likely a cartoon image), and the query image may be evaluated by the image search and comparison engine. If the edge crossing entropy does not exceed the specified threshold then the logo detection module requires more information to determine if the query image is a logo or if it is some other non-natural and non-cartoon (i.e., concept) image. The threshold may be configured by a user, or the threshold may be configured automatically with machine learning techniques. For example, a user may configure the edge crossing entropy threshold to 6.75, so that a query image with an edge crossing entropy greater than 6.75 will be identified as not a logo (i.e., a cartoon image).

If the edge crossing evaluation module 306 determined that the query image is not a cartoon image, then a gradient magnitudes evaluation module 308 evaluates gradient magnitudes found in the image to determine whether the query image is likely a concept image, or whether it is a logo. As described in greater detail herein, with reference to FIGS. 8 and 9, the gradient magnitudes evaluation module 308 computes the gradient magnitudes for the query image. The gradient magnitudes evaluation module 308 then calculates the distribution of the gradient magnitudes, which is evaluated for its conformity to a power function with a negative exponent. If the distribution of the gradient magnitudes conforms to such a function then the image is identified as not a logo (i.e., the image is likely a concept image), and the query image may be evaluated by the image search and comparison engine. If the distribution does not conform to a power function with a negative exponent then the query image is identified as a logo and will not be evaluated by the image search and comparison engine.

Flows for a Logo Detection System

Figure 4:
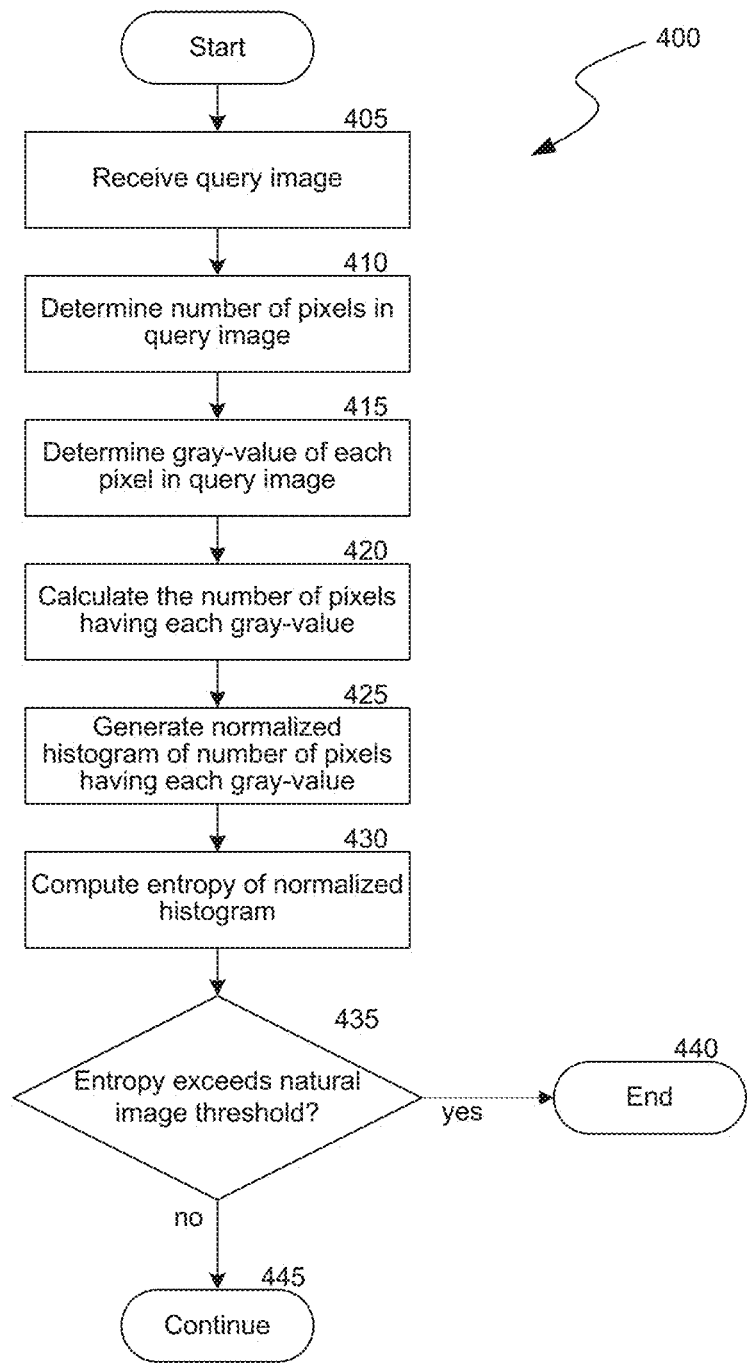
FIG. 4 is a flow diagram of a process for evaluating the gray-level entropy of an image.

FIG. 4 is a flowchart illustrating an example process 400, implemented by the logo detection module 102 in the logo detection system 100, for evaluating gray-levels of a query image to determine if the query image is a natural image or a logo.

Figure 6:
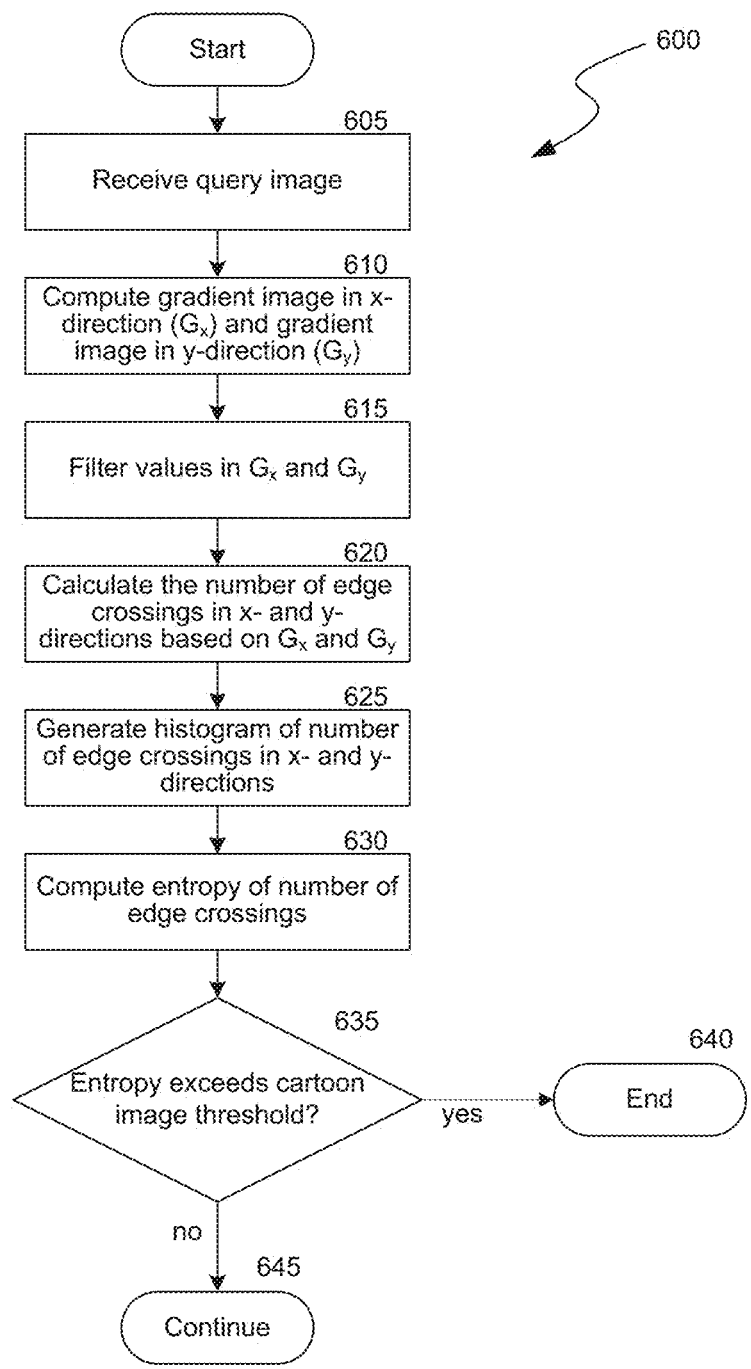
FIG. 6 is a flow diagram of a process for evaluating the entropy of the number of edge crossings in an image.
Figure 8:
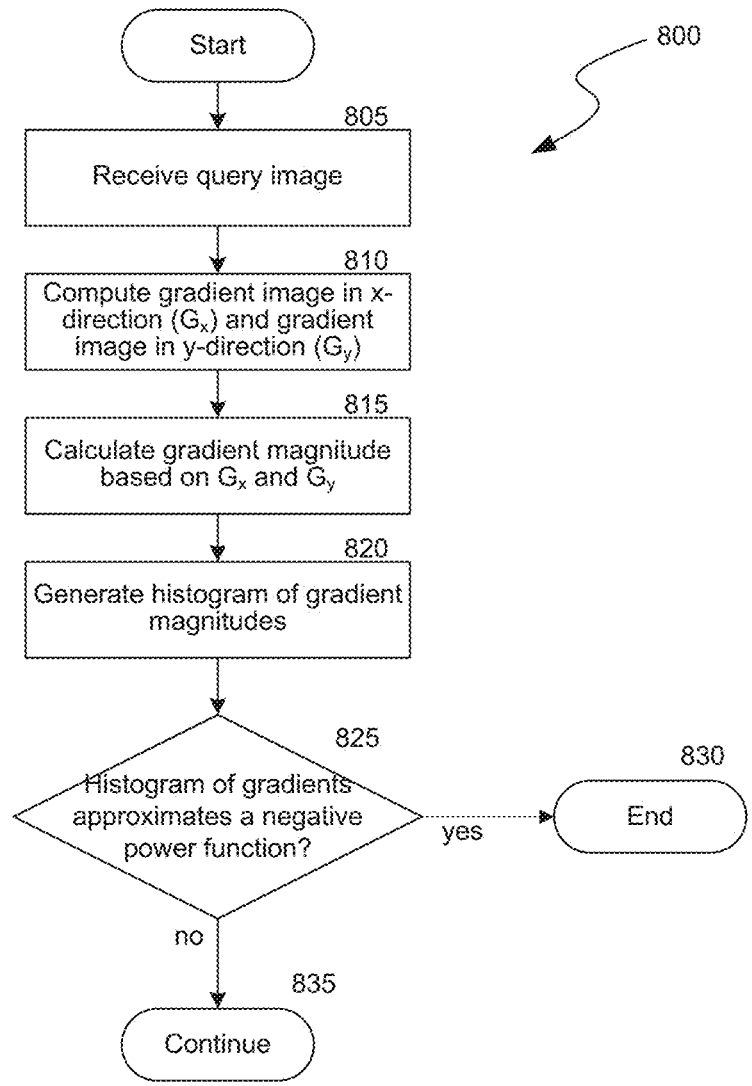
FIG. 8 is a flow diagram of a process for evaluating the gradient magnitudes in an image.

At a block 405, the logo detection system 100 receives a query image. The query image may be received as part of an automated collection of images available on the World Wide Web, as described above. Prior to the block 405, the query image may have been processed by the pre-processing module 302, or may have been evaluated by processes 600 or 800, as illustrated in FIGS. 6 and 8, respectively.

At a block 410, the system determines the total number of pixels, N, in the query image. At a block 415, for each pixel in the query image, the system determines the gray-level of that pixel. The gray-level is determined using, for example, well known algorithms such as averaging of pixel values, luma, desaturation, etc. A representative formula to apply to determine each grayscale pixel value (PV) is Gray PV=(Red PV*0.3+Green PV*0.59+Blue PV*0.11). Applying such a formula to each pixel value results in a gray-level value range from 0 to k for the image.

At a block 420, for each possible gray-level from 0 to k, the system calculates the number of pixels in the query image having that gray-level value. In other words, block 420 characterizes a function H, where H(k) specifies the number of pixels with gray-level k.

At a block 425, the system generates the normalized histogram of gray-levels P(k), where P(k)=H(k)/N. At a block 430, the system computes the entropy of the normalized histogram, which characterizes the scarcity, or number of points, in the normalized histogram. The entropy of image gray-levels, E(Gray), may for example be calculated by E(Gray)=$-\Sigma_k$P(k) log P(k).

Figure 5:
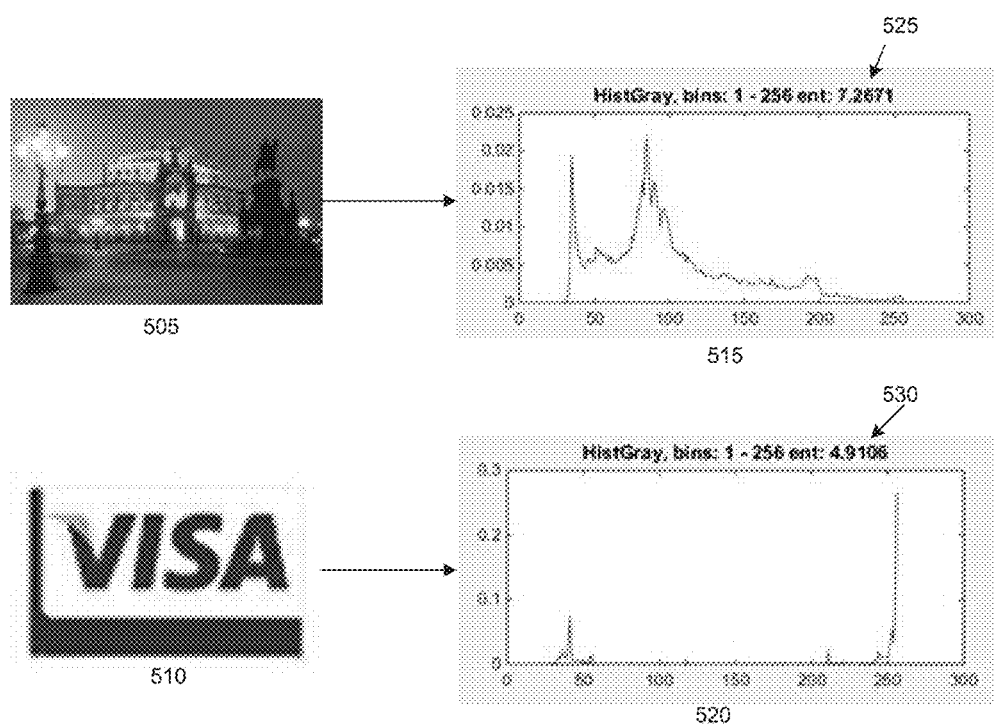
FIG. 5 illustrates a result of evaluating the gray-level entropy of a natural image and of a logo.

At a decision block 435, the system determines whether the entropy of gray-levels for the query image exceeds a threshold value associated with natural images. FIG. 5 depicts two images, a natural image 505 and a logo 510, that have been processed in accordance with blocks 405-425 to calculate the entropy E(Gray) of each image. For each image, the gray-level histograms 515 and 520 are displayed, as well as the calculated entropy values 525 and 530 of the histograms. As illustrated in FIG. 5, the gray-level histograms of natural images tend to have a large number of points in the graph, or greater entropy, while gray-level histograms of logos tend to have few points, or lesser entropy. If the calculated query image gray-level entropy exceeds a threshold value then the query image is identified as a natural image, and processing continues to a block 440. If the query image gray-level entropy does not exceed the threshold value then the query is not identified as a natural image, and processing continues to a block 445. The entropy threshold used at the decision block 435 may be configured by a user of the logo detection system or may be trained, such as with machine learning. For example, a large set of known natural images and a large set of known logos may be used to train the system. A gray-level entropy threshold of 6.5 may be used by the system.

If processing continued to block 440, then the query image was identified as a natural image. The query image may then be evaluated by an image search and comparison engine, such as previously described, to identify any identical or near-identical images in an image catalog maintained by the engine.

If processing continued to block 445, then the query image was not identified as a natural image. Although the query image was determined to not be a natural image, the system is unable to reasonably determine if the image is a logo until further evaluations have been completed. For example, one or more of the edge crossings and the gradient magnitudes of the query image may need to be evaluated to identify possible cartoon images and concept images, respectively. The system therefore performs one or more such additional checks in order to further assess the query image.

FIG. 6 is a flowchart illustrating an example process 600, implemented by the logo detection module 102 in the logo detection system 100, for evaluating edge crossings of a query image to determine if the query image is a cartoon image or a logo.

At a block 605, the logo detection system 100 receives a query image. The query image may be received as part of an automated collection of images available on the World Wide Web, as described above. Prior to the block 605, the query image may have been processed by the pre-processing module 302, or may have been evaluated by processes 400 or 800, as illustrated in FIGS. 4 and 8, respectively.

At a block 610, the system computes gradients $G_x$ and $G_y$ of the query image for the x- and y-direction, respectively. Each image gradient is a matrix of values that characterize the directional change in the intensity of the query image for the gradient's associated direction. The image gradients may be computed by convolving the query image with a kernel, such as the Sobel operator, as well as other techniques known in the art. Any different operator may be used as the kernel for computing image gradients. For example, the filter K=[−1 0 1] may be used to compute $G_x$, and the transposition of K, K', may be used to compute $G_y$. At a block 615, the system filters low gradient values contained in the matrix of $G_x$ and $G_y$, such as those belonging to the lowest 5% of gradient values, from the image gradients by zeroing out the values.

Figure 7A:
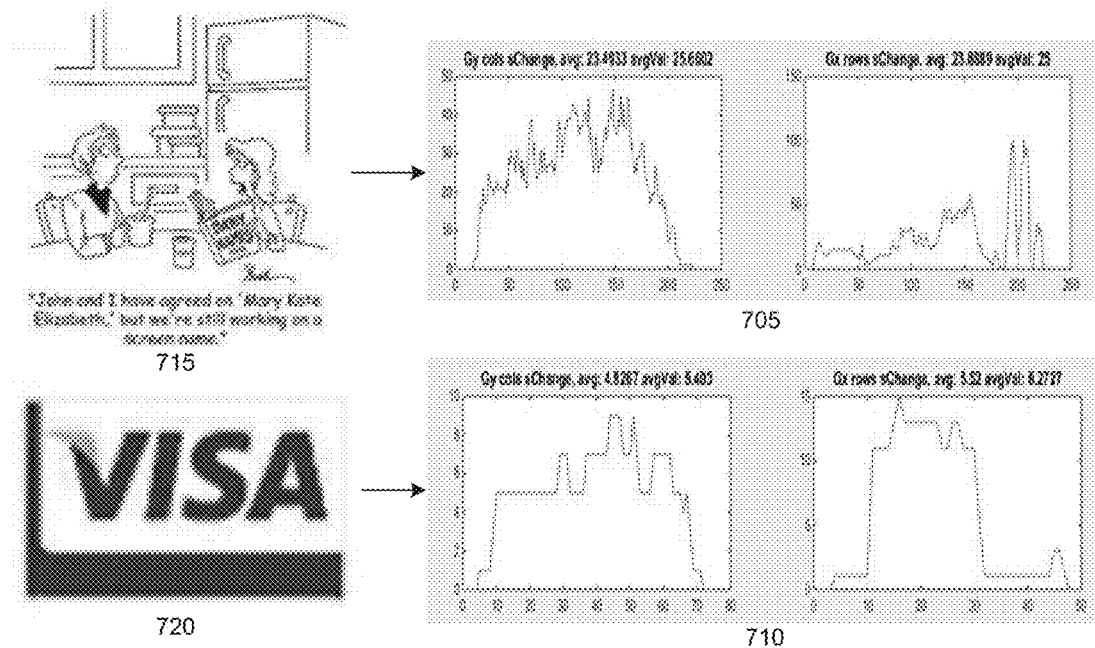
FIGS. 7A-7B illustrate a number of edge crossings and a histogram of edge crossings in a cartoon image and in a logo.

At a block 620, the system uses the computed image gradients to calculate the number of edges crossed within each row and column of the query image. For example, if $CR_i$ denotes the number of edge crossings in row i of the query image, then $CR_i$ may be calculated based on the number of times that $G_x$ changes in the ith row. Similarly, if $CC_j$ denotes the number of edge crossings in column j of the query image, then $CC_j$ may be calculated based on the number of times that $G_y$ changes in the jth column. FIG. 7A illustrates example plots 705, 710 of the number of column edge crossings and row edge crossings for a cartoon image 715 and logo 720, respectively.

Figure 7B:
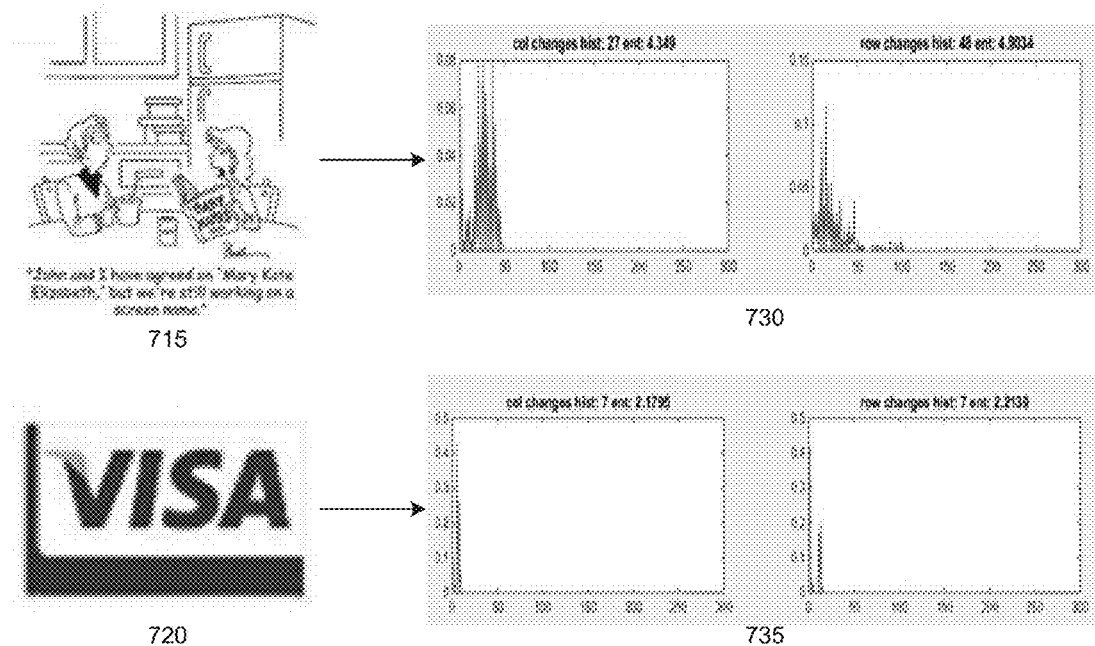

At a block 625, the system generates histograms PCR and PCC of the number of query image row and column edge crossings, respectively. As shown in FIG. 7B, which illustrates example PCR and PCC histograms 730, 735 of the number of row and column edge crossings for a cartoon image 715 and logo 720, cartoon images typically possess greater line complexity than logos, with a greater variance in the number of edges crossed in the different rows and columns of the cartoon image.

At a block 630, the system computes the entropy of the number of edge crossings in the query image. For example, if E(C) denotes the entropy of the number of edge crossing in the query image, let E(C)=E(CR)+E(CC) (i.e., the sum of the row and column edge crossing entropies), where E(CR)=$-\Sigma_i$PCR(k) log PCR(k) and E(CC)=$-\Sigma_j$PCC(k) log PCC(k).

At a decision block 635, the system determines whether the entropy of query image number edge crossings exceeds a threshold value associated with cartoon images. As previously described, cartoon images tend to have greater line complexity, which results in a larger number of points in a histogram of number of edge crossings and a greater entropy, as compared to logos. If the query image number of edge crossings entropy exceeds the threshold value then the query image is identified as a cartoon image, and processing continues to a block 640. If the entropy does not exceed the threshold value then the query image is not identified as a cartoon image and processing continues to a block 645. As described above, the entropy threshold used at the decision block 635 may be configured by a user of the logo detection system or may be trained, such as with machine learning. For example, a large set of known cartoon images and a large set of known logos may be used to train the system. An edge crossing entropy threshold of 6.75 may be used by the system.

If processing continued to block 640, then the query image was identified as a cartoon image. The query image may then be evaluated by an image search and comparison engine, such as was previously described, to identify any identical or near-identical images in an image catalog maintained by the engine.

If processing continued to block 645, then the query image was not identified as a cartoon image. Although the query image was determined to not be a cartoon image, the system is unable to reasonably determine if the image is a logo until further evaluations have been completed. For example, one or more of the gray-levels and the gradient magnitudes of the query image may need to be evaluated to identify possible natural images and concept images, respectively. The system therefore performs one or more such additional checks in order to further assess the query image FIG. 8 is a flowchart illustrating an example process 800, implemented by the logo detection module 102 in the logo detection system 100, for evaluating the gradient magnitude of a query image to determine if the query image is a concept image or a logo.

At a block 805, the logo detection system 100 receives a query image. The query image may be received as part of an automated collection of images available on the World Wide Web, as described above. Prior to the block 805, the query image may have been processed by the pre-processing module 302, or may have been evaluated by processes 400 or 600, as illustrated in FIGS. 4 and 6, respectively.

At a block 810, the system computes gradients $G_x$ and $G_y$ of the query image for the x- and y-direction, respectively. As described above, each image gradient is a matrix of values that characterize the directional change in the intensity of the query image for the gradient's associated direction. The image gradients may be computed by convolving the query image with a kernel, such as the Sobel operator, as well as other techniques known in the art. Any different operator may be used as the kernel for computing image gradients. For example, the filter K=[−1 0 1] may be used to compute $G_x$, and the transposition of K, K', may be used to compute $G_y$. At a block 815, the system uses the computed image gradients to calculate the gradient magnitude, denoted $G_{xy}$, where $G_{xy} = \sqrt{G_x^2 + G_y^2}$. At a block 820, the system generates a histogram of the gradient magnitudes, denoted $PG_{xy}$.

Figure 9:
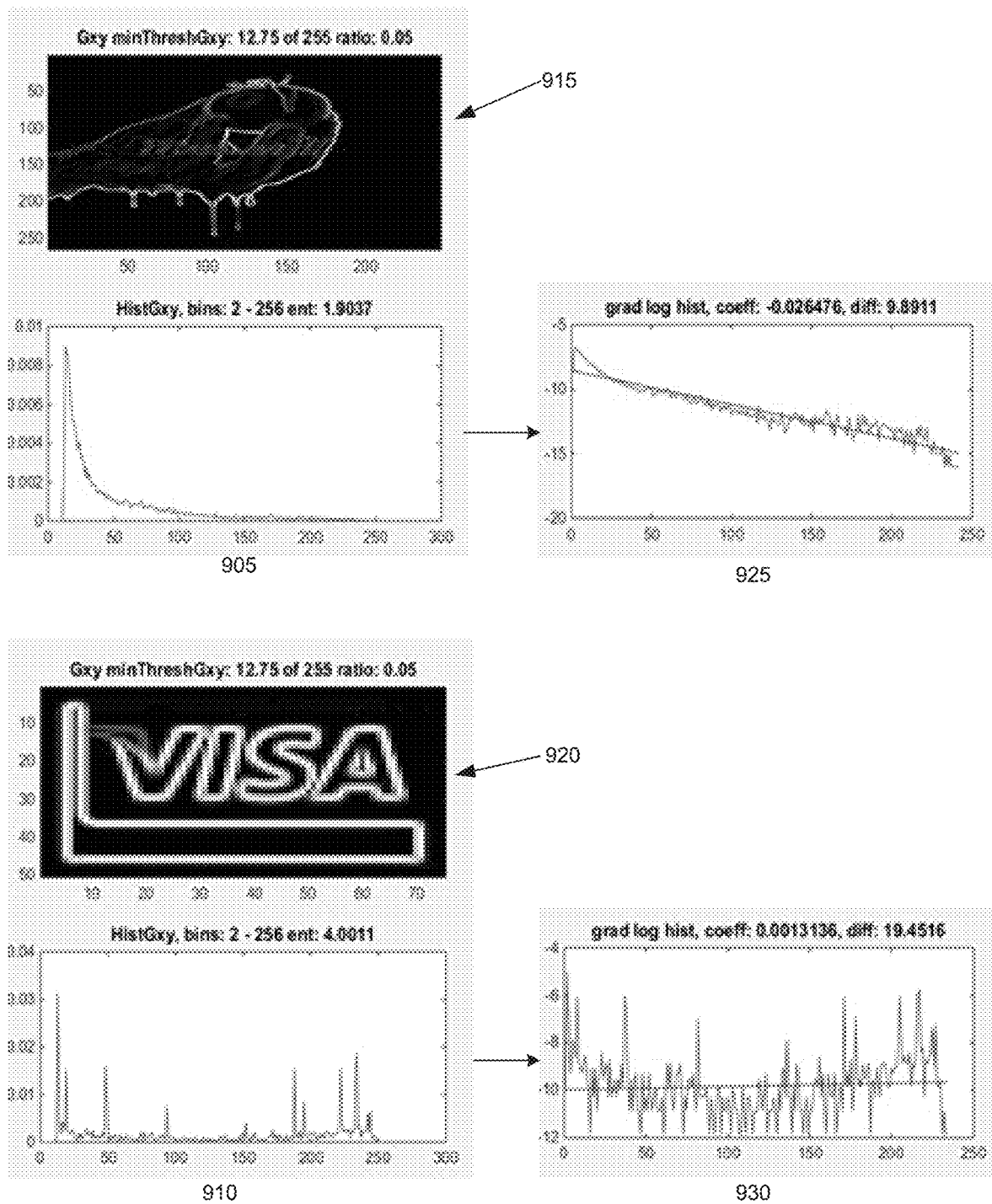
FIG. 9 illustrates a result of evaluating the gradient magnitudes in a concept image and in a logo.

FIG. 9 illustrates histograms 905, 910 of gradient magnitudes for an example concept image 915 and logo 920. It has been determined that histograms for concept images typically show a spike of many small-magnitude gradients and few large-magnitude gradients. This distribution occurs because concept images typically focus on a single object within the image, resulting in a distribution 925 resembling a power function with a negative exponent. In contrast, as also illustrated in FIG. 9, the distribution of gradient magnitudes 930 for logos do not resemble a power function with a negative exponent.

Returning to FIG. 8, at a decision block 825 the system determines whether the histogram of gradient magnitudes for the query image approximates a power function with a negative exponent. To determine whether the query image approximates a power function, the system calculates the logarithm of the histogram of gradient magnitudes, $LPG = \log(PG_{xy})$. The system then constructs a linear function using standard linear regression techniques that best fits the calculated LPG. As illustrated in FIG. 9, if the constructed linear regression is an accurate approximation of the calculated LPG with a negative slope of sufficient magnitude, then $PG_{xy}$ sufficiently resembles a power function with a negative coefficient, and the query image is identified as a concept image. Processing then continues to a block 830. If based on the linear approximation $PG_{xy}$ does not sufficiently resemble a power function with a negative exponent, then the query image is not identified as a concept image, and processing continues to a block 835.

If processing continued to block 830, then the query image was identified as a concept image. The query image may then be evaluated by an image search and comparison engine, such as was previously described, to identify any identical or near-identical images in an image catalog maintained by the engine.

If processing continued to block 835, then the query image was not identified as a concept image. Although the query image was determined to not be a concept image, the system is unable to reasonably determine if the image is a logo until further evaluations have been completed. For example, one or more of the gray-levels and the number of edge crossings of the query image may need to be evaluated to identify possible natural images and cartoon images, respectively. The system therefore performs one or more such additional checks in order to further assess the query image.

FIGS. 3, 4, 6, and 8 illustrate example flows in which the logo detection system ceases to evaluate a query image once a single factor is evaluated and indicates that the query image is not a logo (e.g., the entropy of gray-levels indicates the query image is a natural image), with each factor evaluated independently. The determination of whether a query image is a logo may also be based on a combination of factors. That is, the system may evaluate the entropy of gray-levels, the entropy of number of edge crossings, and the histogram of gradient magnitudes, in combination, to assess whether a query image is a logo. The assessment may represent the probability that the query image is a logo. The evaluation of each of the factors may be associated with a weighting, and the assessment of the probability that the query image is a logo may be based on the weighting of each of the factors' evaluations. The weightings may be configured by a user, or the weightings may be configured automatically with machine learning techniques.

The threshold values recited herein, for example with respect to processes 400 and 600 (e.g., the edge crossings entropy threshold of 6.75), are for representative purposes only. As described herein, other threshold values, which may be configured by a user of the system or may be configured automatically, may be used. Actual threshold values used by the system may differ from the representative threshold values.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/ or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

I claim:

1. A method in a computing system for determining whether a query image is a logo and preventing identified logos from being searched within a catalog of images, the method comprising:
   receiving a query image that is to be searched against a catalog of images, wherein the query image is comprised of a plurality of pixels;
   evaluating pixel-values associated with each of the plurality of pixels of the query image to calculate a first factor indicative of whether the query image is a natural image;
   evaluating a plurality of edge crossings in the query image to calculate a second factor indicative of whether the query image is a cartoon image;
   evaluating gradient magnitudes of the query image to calculate a third factor indicative of whether the query image is a concept image, wherein evaluating the gradient magnitudes comprises evaluating whether a distribution of the gradient magnitudes resembles a power function having a negative exponent;
   associating a weighting with each of the first, second, and third factors;
   determining whether the query image is a logo based on the weighted first, second, and third factors;
   using the query image to search within the catalog of images if the query image is not a logo; and
   not using the query image to search within the catalog of images if the query image is a logo.

2. The method of claim 1, further comprising, after receiving the query image, processing the query image by:
   converting the query image to grayscale, and
   resizing the query image.

3. The method of claim 1, wherein evaluating the pixel-values associated with each of the plurality of pixels of the query image comprises:
   calculating the number of pixels in the query image having each of the pixel-values; and
   calculating an entropy of the number of pixels in the query image having each of the pixel-values.

4. The method of claim 1, wherein evaluating the plurality of edge crossings in the query image comprises:
   calculating the number of edge crossings in the query image; and
   calculating an entropy of the number of edge crossings in the query image.

5. The method of claim 1, wherein evaluating the gradient magnitudes of the query image further comprises:
   calculating the gradient magnitudes of the query image; and
   generating the distribution of the gradient magnitudes in the query image.

6. The method of claim 1, wherein the evaluation of whether the distribution of gradient magnitudes resembles the power function having a negative exponent is based on calculating a linear approximation of the logarithm of the distribution and comparing the calculated linear approximation with the logarithm of the distribution.

7. The method of claim 1, wherein the query image is excerpted from a video.

8. A method in a computing system for determining whether a query image is a logo, the method comprising:
   receiving a query image that is to be evaluated to determine whether the image is a logo, wherein the image is comprised of a plurality of pixels, each pixel having an associated pixel value;
   applying image tests comprising:
      a first image test to determine whether an entropy of the pixel-values associated with each of the plurality of pixels of the query image exceeds a threshold entropy;
      a second image test to determine whether an entropy of a plurality of edge crossings in the query image exceeds a threshold entropy; and
      a third image test to determine whether a distribution of gradient magnitudes of the query image resembles a power function having a negative exponent;
   associating each of the image tests with a weighting; and
   identifying a likelihood that the query image is a logo based on the weighting of each of the image tests.

9. The method of claim 8, further comprising, after receiving the query image, processing the query image by:
   converting the query image to grayscale, and
   resizing the query image.

10. A non-transitory computer-readable medium encoded with instructions that, when executed by a processor, perform a method to prevent logos from being searched within a catalog of images, the method comprising:
    receiving a query image that is to be searched against a catalog of images, wherein the query image is comprised of a plurality of pixels;
    evaluating pixel-values associated with each of the plurality of pixels of the query image to calculate a first factor indicative of whether the query image is a natural image;
    evaluating a plurality of edge crossings in the query image to calculate a second factor indicative of whether the query image is a cartoon image;
    evaluating gradient magnitudes of the query image to calculate a third factor indicative of whether the query image is a concept image, wherein evaluating the gradient magnitudes of the query image comprises evaluating whether a distribution of the gradient magnitudes resembles a power function having a negative exponent;
    associating a weighting with each of the first, second, and third factors;
    determining whether the query image is a logo based on the weighted first, second, and third factors;
    using the query image to search within the catalog of images if the query image is not a logo; and not using the query image to search within the catalog of images if the query image is a logo.

11. The non-transitory computer-readable medium of claim 10, further encoded with instructions that when executed by the processor perform the method to prevent logos from being searched within a catalog of images, the method further comprising:
converting the query image to grayscale, and
resizing the query image.

12. The non-transitory computer-readable medium of claim 10, wherein evaluating the pixel-values associated with each of the plurality of pixels of the query image comprises:
calculating the number of pixels in the query image having each of the pixel-values; and
calculating an entropy of the number of pixels in the query image having each of the pixel-values.

13. The non-transitory computer-readable medium of claim 10, wherein evaluating the plurality of edge crossings in the query image comprises:
calculating the number of edge crossings in the query image; and
calculating an entropy of the number of edge crossings in the query image.

14. The non-transitory computer-readable medium of claim 10, wherein evaluating the gradient magnitudes of the query image further comprises:
calculating the gradient magnitudes of the query image; and
generating the distribution of the gradient magnitudes in the query image.

15. The non-transitory computer-readable medium of claim 10, wherein the evaluation of whether the distribution of gradient magnitudes resembles the power function having a negative exponent is based on calculating a linear approximation of the logarithm of the distribution and comparing the calculated linear approximation with the logarithm of the distribution.

16. The non-transitory computer-readable medium of claim 10, wherein the query image is excerpted from a video.

17. A non-transitory computer-readable medium encoded with instructions that, when executed by a processor, perform a method for determining whether a query image is a logo, the method comprising:
receiving a query image that is to be evaluated to determine whether the image is a logo, wherein the image is comprised of a plurality of pixels, each pixel having an associated pixel value;
applying image tests comprising:
a first image test to determine whether an entropy of the pixel-values associated with each of the plurality of pixels of the query image exceeds a threshold entropy; and
a second image test to determine whether a distribution of gradient magnitudes of the query image resembles a power function having a negative exponent;
associating each of the image tests with a weighting; and
identifying a likelihood that the query image is a logo based on the weighting of each of the image tests.

18. The non-transitory computer-readable medium of claim 17, further encoded with instructions that when executed by the processor perform the method for determining whether a query image is a logo, the method further comprising, after receiving the query image, processing the query image by:
converting the query image to grayscale, and
resizing the query image.

* * * * *